ized*

United States Patent
Zhang

(10) Patent No.: US 12,132,370 B2
(45) Date of Patent: Oct. 29, 2024

(54) METHOD TO IMPROVE E-MACHINE DURABILITY

(71) Applicant: FORD GLOBAL TECHNOLOGIES, LLC, Dearborn, MI (US)

(72) Inventor: Xiaogang Zhang, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 285 days.

(21) Appl. No.: 17/591,565

(22) Filed: Feb. 2, 2022

(65) Prior Publication Data

US 2023/0246505 A1 Aug. 3, 2023

(51) Int. Cl.
| | |
|---|---|
| *H02K 3/50* | (2006.01) |
| *H02K 5/173* | (2006.01) |
| *H02K 5/24* | (2006.01) |
| *B60L 7/10* | (2006.01) |
| *B60L 50/60* | (2019.01) |

(52) U.S. Cl.
CPC ............. *H02K 3/50* (2013.01); *H02K 5/173* (2013.01); *H02K 5/24* (2013.01); *B60L 7/10* (2013.01); *B60L 50/60* (2019.02); *H02K 2203/06* (2013.01)

(58) Field of Classification Search
CPC .................... H02K 3/50; H02K 5/24
See application file for complete search history.

(56) References Cited

U.S. PATENT DOCUMENTS

| | | | |
|---|---|---|---|
| 6,941,638 | B2 | 9/2005 | Hartsfield, Jr. et al. |
| 8,183,728 | B2 | 5/2012 | Schaeflein et al. |
| 8,342,880 | B2 | 1/2013 | Kato et al. |
| 2020/0235631 | A1 | 7/2020 | Wisner et al. |
| 2020/0350802 | A1 | 11/2020 | Degner et al. |

FOREIGN PATENT DOCUMENTS

CN 212210639 U * 12/2020 ............... H02K 3/50

* cited by examiner

*Primary Examiner* — Ramon M Barrera
(74) *Attorney, Agent, or Firm* — David B. Kelley; Brooks Kushman P.C.

(57) ABSTRACT

An e-machine that provides propulsion and regenerative braking includes a rotor and a stator that includes pin conductors encircling the stator. Current is conducted around the stator for a plurality of phases of alternating current. Phase terminals and neutral terminals are connected by terminal connectors to a plurality of wires that connect to the neutral terminal or connect the phase terminals to a source of alternating current. The terminal contacts include means for dampening vibration disposed adjacent terminals. The means for dampening vibration may include a spiral segment of the wire that encircles the terminal or the spiral segment may be disposed adjacent the terminal. A flexible joint assembly may be a clamp including a terminal contact that is movable on ball bearings between an upper jaw and a lower jaw. Another flexible joint assembly may include a receptacle that receives a plug supported on ball bearings.

2 Claims, 4 Drawing Sheets

METHOD TO IMPROVE E-MACHINE DURABILITY

TECHNICAL FIELD

This disclosure relates to vibration dampening lead connections to an e-machine.

BACKGROUND

E-machines are used in electric vehicles to provide propulsion and regenerative braking. E-machines include terminals for each power phase that are connected to a battery through an AC inverter with wire leads and neutral terminals of the stator. E-machines are subjected to vibrations caused by vehicle operation and operation of the e-machine. In durability testing, the e-machine is shaken in three directions with a predetermined force at predetermined frequencies.

SUMMARY

According to one aspect of this disclosure, an e-machine is disclosed that comprises a rotor and a stator that includes pin conductors encircling the stator for conducting current around the stator for a plurality of phases of alternating current. A plurality of wires are adapted to connect the phase terminals to a source of alternating current and to neutral terminals. A plurality of terminal contacts are each connected to one of the plurality of wires. Each terminal contact is connected to one of the terminals. The wires or terminal contacts include a structure, or means, that dampens vibration at a location adjacent one of the terminals.

According to another aspect of this disclosure, an e-machine is disclosed that comprises a rotor and a stator that includes pin conductors encircling the stator for conducting current around the stator for a plurality of phases of alternating current. At least one phase terminal, at least one neutral terminal, and a plurality of wires are each adapted to connect the phase terminals to a source of current. A plurality of terminal contacts are each connected to one of the plurality of wires. Each terminal contact is connected to one of the terminals. A flexible joint assembly includes a terminal contact attached to one of the wires that is received in a cavity defined by a receptacle. Ball bearings in the cavity engage the terminal contact and current flows from the terminal contact through the ball bearings to the receptacle. Alternatively, the flexible joint assembly may be a clamp structure that engages a plurality of ball bearings that engage the terminal contacts.

According to yet another aspect of this disclosure, an e-machine is disclosed that comprises a rotor and a stator that includes pin conductors encircling the stator. The pin conductors conduct current around the stator for a plurality of phases of alternating current. Phase terminals, neutral terminals, and a plurality of wires connect one of the phase terminals or neutral terminals to a source of current. Terminal contacts are connected to each of the wires. Each terminal contact is connected to one of the terminals. At least one of the wires includes a spiral segment where the wires are connected to the terminal contacts.

Other potential features of this disclosure that may be combined with the aspects as described above. The means for dampening vibration may be a portion of one of the plurality of wires that encircles the terminal. Alternatively, the means for dampening vibration may be a portion of one of the wires connected to the terminal contact comprising a spiral bend in the wire adjacent the terminal contact. The means for dampening vibration may be a spiral portion of one of the plurality of wires that function to damp vibrations in an X-direction, a Y-direction, and a Z-direction or in an X-direction and a Y-direction.

The terminal contact may be a circular disk and the spiral bend may extend radially outwardly from the terminal contact to a portion of the wire that extends in an axial direction relative to the terminal contact. Alternatively, the terminal contact may be a circular disk and the spiral bend may be connected to the terminal contact with the spiral bend extending in an axial direction to a portion of the wire that extends in the axial direction.

The means for dampening vibrations may be a flexible joint assembly extending from the terminal between the wire and the terminal contact wherein the flexible joint assembly may include a receptacle, a terminal contact attached to or formed on the wire that is received in the receptacle, a plurality of ball bearings disposed around the terminal contact inside the receptacle, and a spring acting on the receptacle to exert a compressive force on the ball bearings and the terminal contact.

The means for dampening vibrations may be a wire clamp including a top jaw and a bottom jaw that define a cavity and are held together by a bolt. The wire may include a disk-shaped terminal contact that defines a hole through which the bolt extends. A plurality of ball bearings may be received in an upper circular race defined between the top jaw and an upper surface of the disk-shaped terminal contact and a lower circular race defined between the bottom jaw and a lower surface of the disk-shaped terminal contact. The bolt applies a clamping force that holds the disk-shaped terminal contact between the top jaw and the bottom jaw.

The above aspects of this disclosure are described in further detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
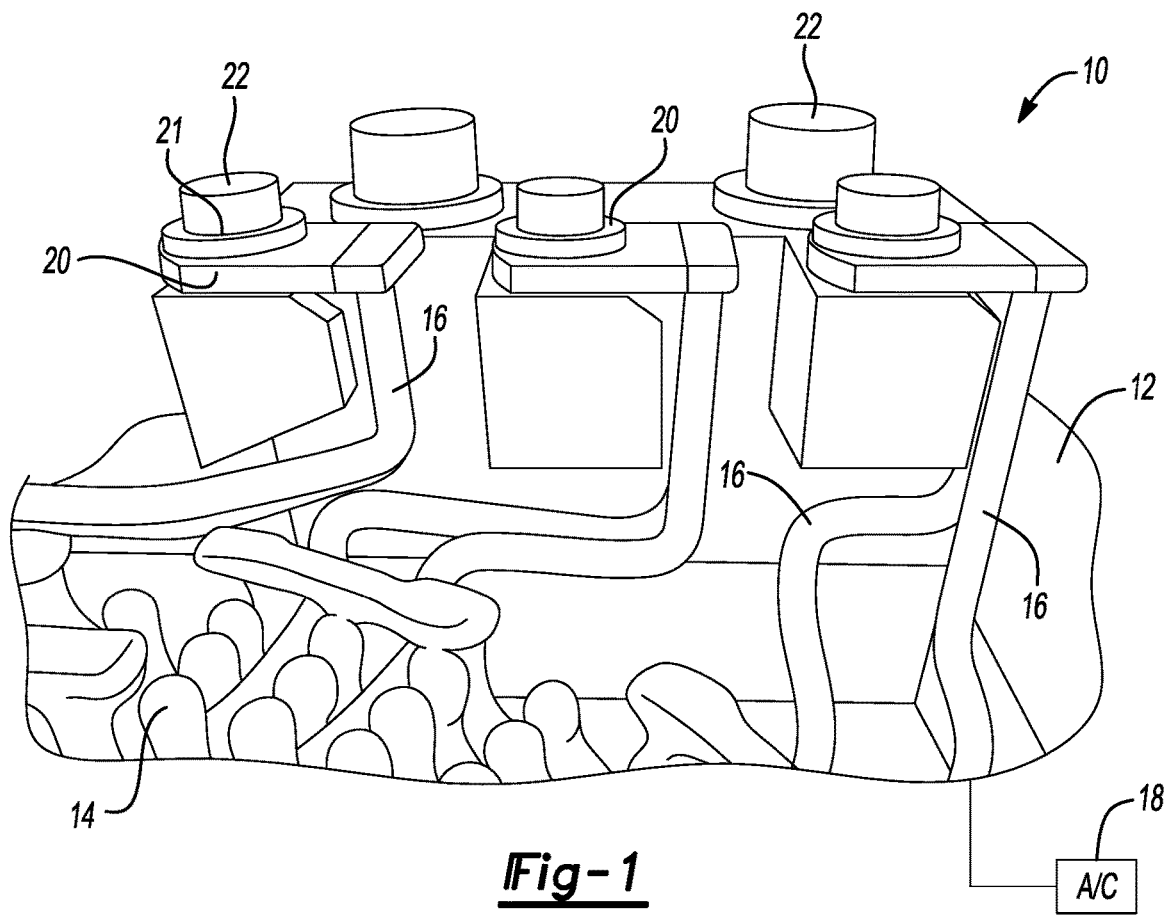
FIG. 1 is a fragmentary perspective view of three lead connections to an e-machine showing an example of the lead connections in one prior art embodiment.

Referring to FIG. 1, a prior art electric motor (hereinafter "e-machine"), is partially shown and is generally indicated by reference numeral 10. The e-machine 10 includes a stator 12 that includes hairpin windings 14 that conduct current around the stator to drive the e-machine or converts kinetic energy by regenerative braking to recharge a vehicle battery (not shown). The hairpin windings are connected by lead wires 16 to a source of alternating current 18 when operating as a motor to provide vehicle propulsion. The hairpin windings provide current to recharge the battery when the vehicle provides regenerative braking. The lead wires 16 are connected by terminal contacts 20 and secured by bolts 22 to the stator 12.

Figure 2:
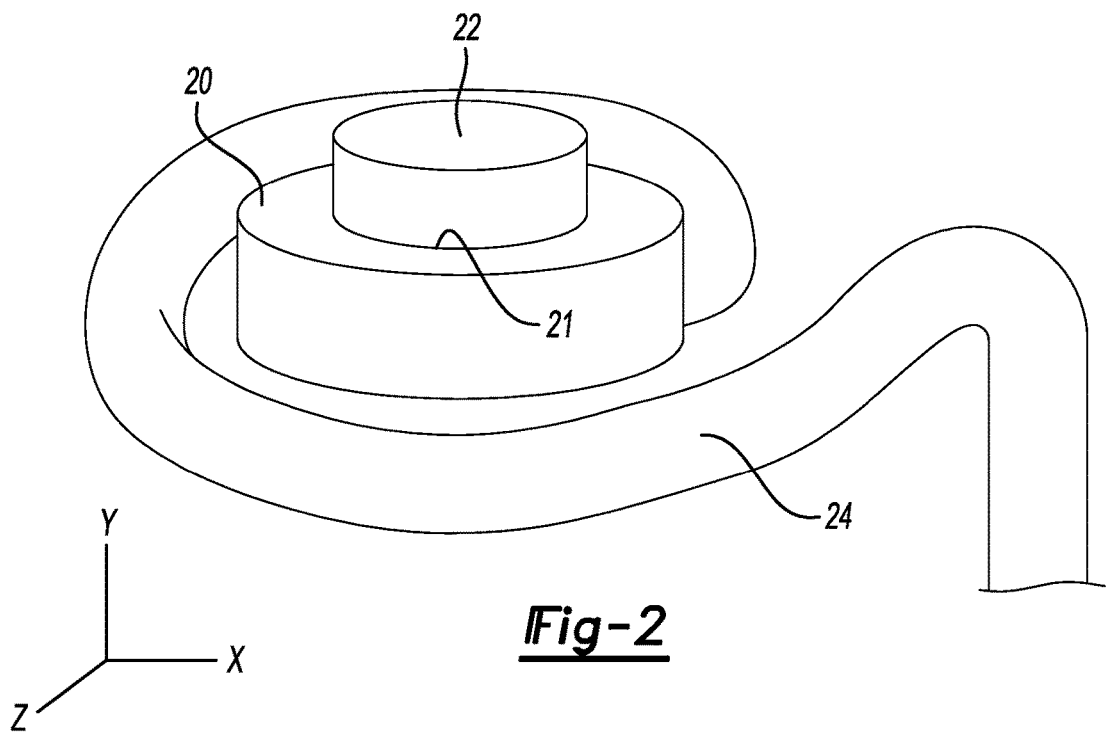
FIG. 2 is a perspective view of a lead connection made according to one aspect of this disclosure.

Referring to FIG. 2, in one embodiment of this disclosure a flexible connection may be provided that comprises lead wires 16 that each include a spiral terminal end portion 24 (hereinafter "spiral end") that encircles the terminal contact 20. The terminal contact 20 of this embodiment is in the shape of a circular washer that receives phase lead bolt 22 in an opening 21 defined by the terminal contact 20. It should be understood that the spiral end 24 may be provided for phase lead connections or neutral lead connections.

The spiral end 24 provides damping in all directions including the X, Y, and Z directions. The spiral end 24 by encircling the terminal contact 20 dampens vibrations in the X, Y and Z directions. The spiral end 24 may also be axially elongated to form a spring-like coil that may enhance deflections in the Z direction to increase dampening in the vertical direction. Shocks applied to the phase lead wires 16 by operation of the e-machine stator, the vehicle, or other sources of vibration are damped by the spiral end 24 and reduce any tendency of the lead wire 16 to fracture near the terminal contact.

As described herein terms such as X, Y, and Z directions, top, upper, bottom and lower should be understood to refer to directions relative to the surface where the terminal contact 20 is attached to the stator. The terms "axial direction" and "radial direction" refer to the axis of the bolt 22 used to secure the terminal contact to the stator. These definitions as applied in this disclosure are necessary because the e-machine may be installed in a vehicle in orientations that may be different than absolute, or conventional, directional orientations.

Figure 3:
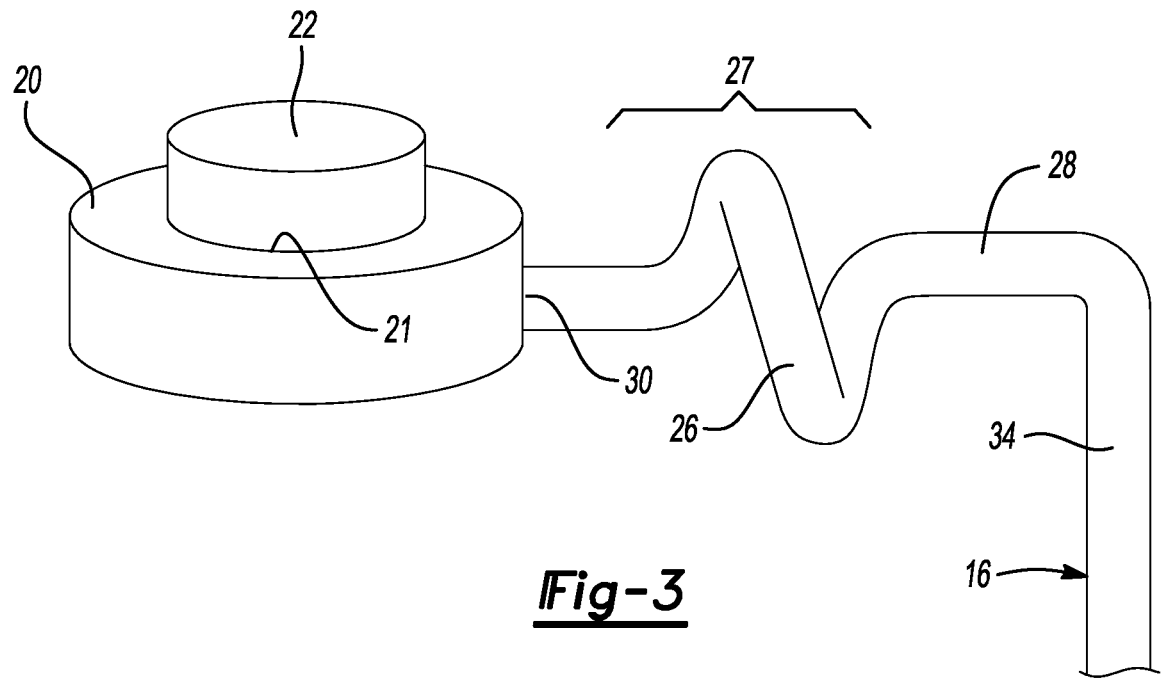
FIG. 3 is a side elevation view of a spiral horizontally oriented lead connection made according to another aspect of this disclosure.

Referring to FIG. 3, another embodiment of the flexible connection is shown that includes a spiral portion 26 on an intermediate location 27 of a horizontal leg 28 of the lead wire 16. The intermediate location 27 is disposed between a terminal end 30 that is connected to the terminal contact 20 and a vertical length 34 of the lead wire 16. The spiral portion 26 provides damping in all directions including the X, Y, and Z directions.

Figure 4:
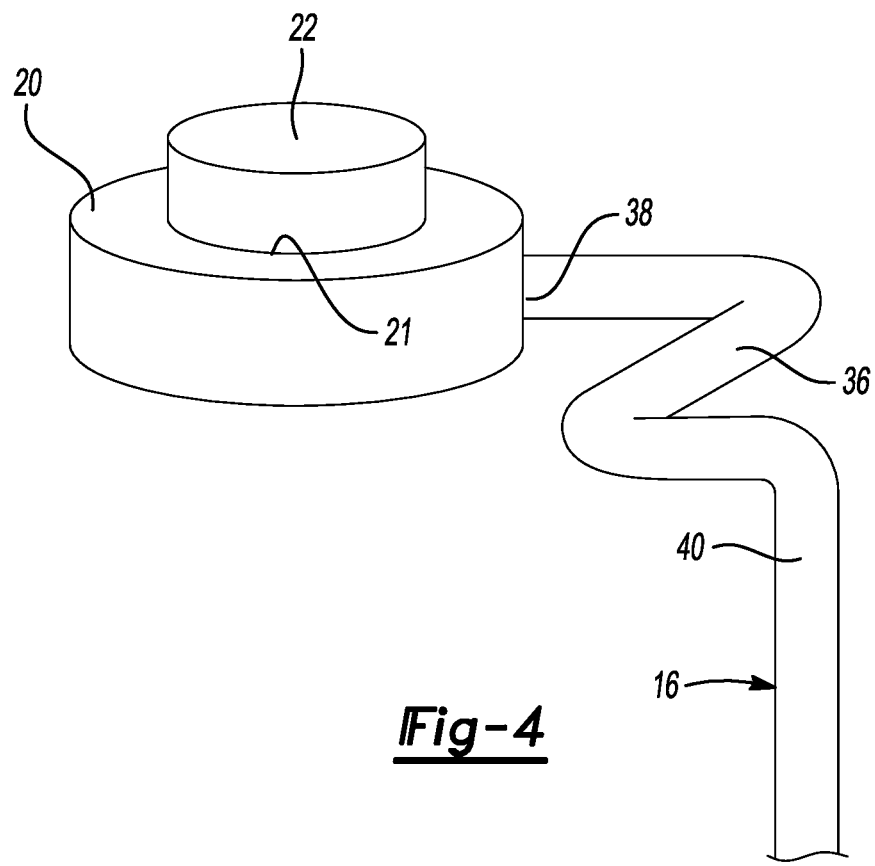
FIG. 4 is a side elevation view of a spiral vertical lead connection made according to another aspect of this disclosure.

Referring to FIG. 4, another embodiment of the flexible connection is shown that includes a spiral portion 36 that is disposed between a terminal end 38 that is connected to the terminal contact 20 and a vertical segment 40 of the lead wire 16.

Figure 5:
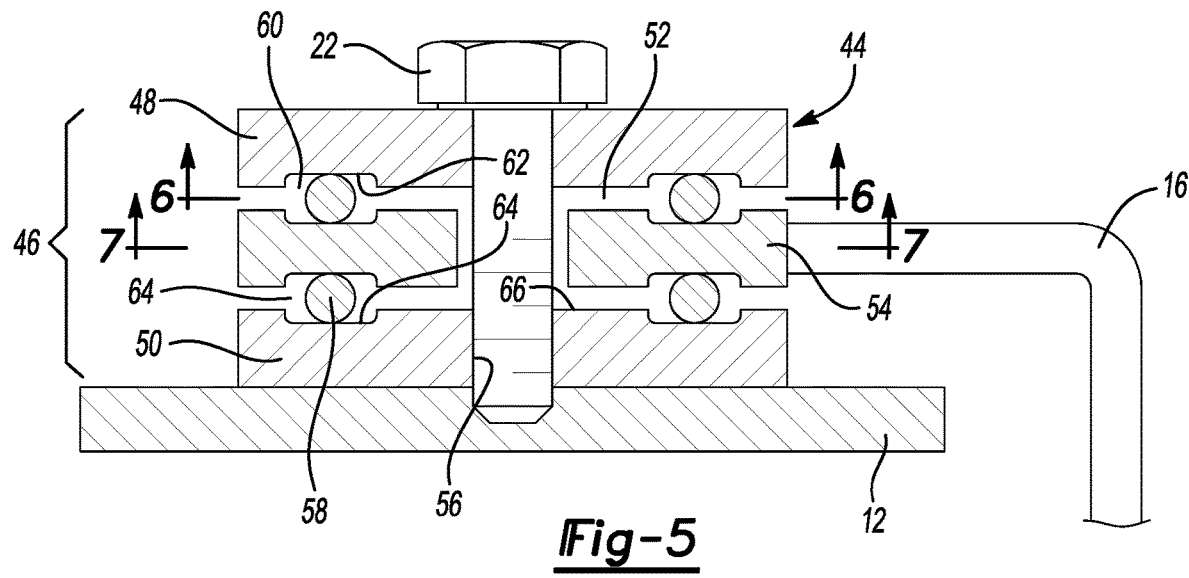
FIG. 5 is a diagrammatic vertical cross-section view of a flexible joint attached to a lead connection bolt.

Referring to FIG. 5, another embodiment of the flexible connection is illustrated that comprises a flexible joint assembly 44 attached to a bolt 22. The flexible joint assembly 44 includes a clamp 46 that has a top jaw 48 and a bottom jaw 50 that define a cavity 52. The top jaw 48 and bottom jaw 50 are disposed on opposite sides of a disk-shaped terminal contact 54 that is connected to a lead wire 16. The top jaw 48, bottom jaw 50, and disk-shaped terminal contact 54 define a hole 36 for receiving one of the bolts 22. A plurality of ball bearings 58 are provided between an upper circular race 60 formed on a lower surface 62 of the top jaw 48 and a lower circular race 64 formed on an upper surface 66 of the bottom jaw 50. The bolt 22 is tightened against the stator 12 to hold the top jaw 48, bottom jaw 50, and disk-shaped terminal contact 54 together.

Figure 6:
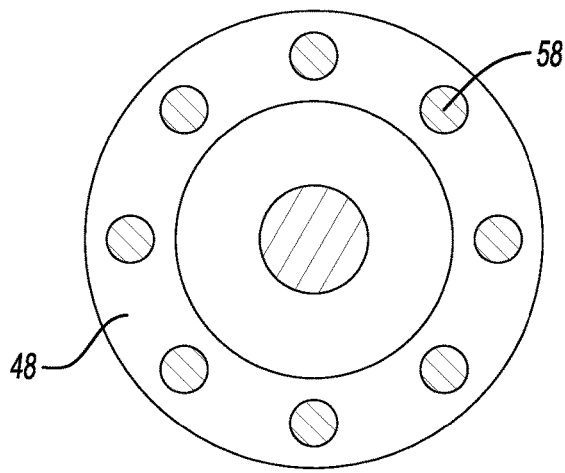
FIG. 6 is a cross-section taken along the line 6-6 in FIG. 5.

Referring to FIGS. 5 and 6, the embodiment of FIG. 5 is shown in a cross-section taken through the ball bearings 58. The ball bearings 58 provide an electrical connection from the disk-shaped terminal contact 54 through the top jaw 48, the bottom jaw 50, and phase lead bolt 22. The ball bearings 58 allow disk-shaped terminal contact 54 to move in the X and Y directions to dampen shocks applied to the phase lead wires 16 by operation of the e-machine, the vehicle or other sources of vibration.

Figure 7:
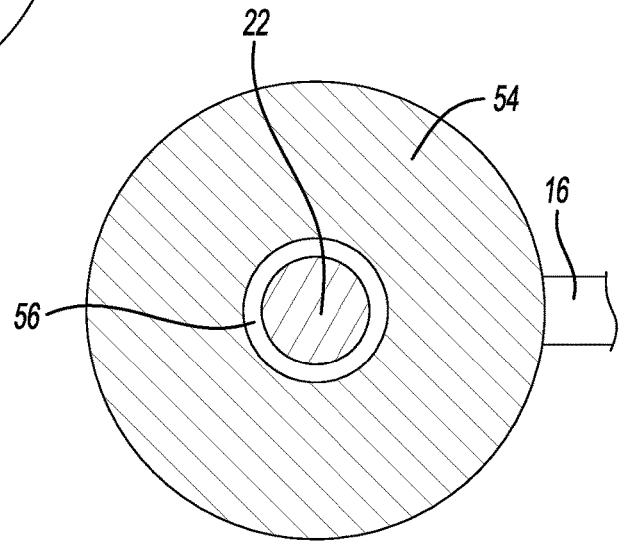
FIG. 7 is a cross-section taken along the line 7-7 in FIG. 5.

Referring to FIG. 7, the embodiment of FIG. 5 is shown in a cross-section taken through the disk-shaped terminal contact 54 that defines the portion of the hole 56 in the disk-shaped terminal end 54. Clearance is provided around the bolt 22 to allow the disk-shaped terminal contact 54 to move in the X and Y directions.

Figure 8:
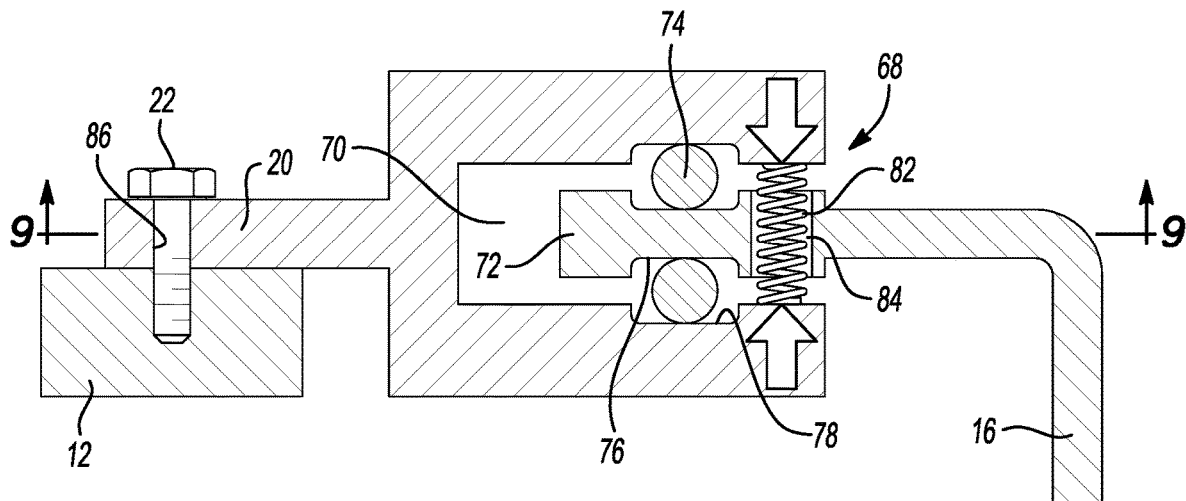
FIG. 8 is a diagrammatic vertical cross-section view of a flexible joint installed between the lead connection and the wire supplying power from a power source.

Referring to FIG. 8, another embodiment of the flexible connection is shown that includes a flexible joint assembly 68. The flexible joint assembly 68 defines a receptacle 70 that is adapted to receive a terminal plug 72. The receptacle 70 and plug 72 are formed with complimentary shapes that may be circular, polygonal, or another shape in cross-section that are provided with a limited amount of clearance relative to each other. The receptacle 70 and the terminal plug 72 are installed between the terminal contact 20 and the lead wire 16.

Figure 9:
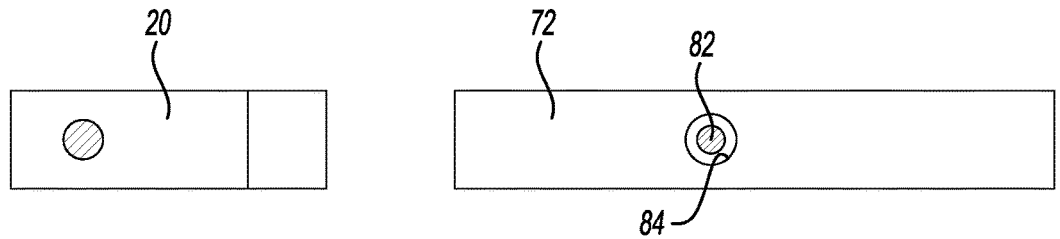
FIG. 9 is a cross-section taken along the line 9-9 in FIG. 8.

Referring to FIGS. 8 and 9, a plurality of ball bearings 74 are assembled between the receptacle 70 and the plug 72. The ball bearings 74 are disposed between an inner race 76 formed on the plug 72 and an outer race 78 formed on the receptacle 70. The ball bearings 74 provide electrical connection between the lead wire 16, the plug 72, the receptacle 70 and the terminal contact 20. The ball bearings 74 allow plug 72 to move in the X and Y directions relative to the receptacle 70 to dampen shocks applied to the phase lead wires 16 by operation of the e-machine, the vehicle, or other sources of vibration. A coil spring 82 exerts a contractive biasing force on the receptacle 70 and is received in a hole 84 defined by the plug 72. The flexible joint 68 defines a bolt receiving hole 86 through which one of the bolts 22 is received to secure the terminal contact 20 to the stator 12.

Figure 10:
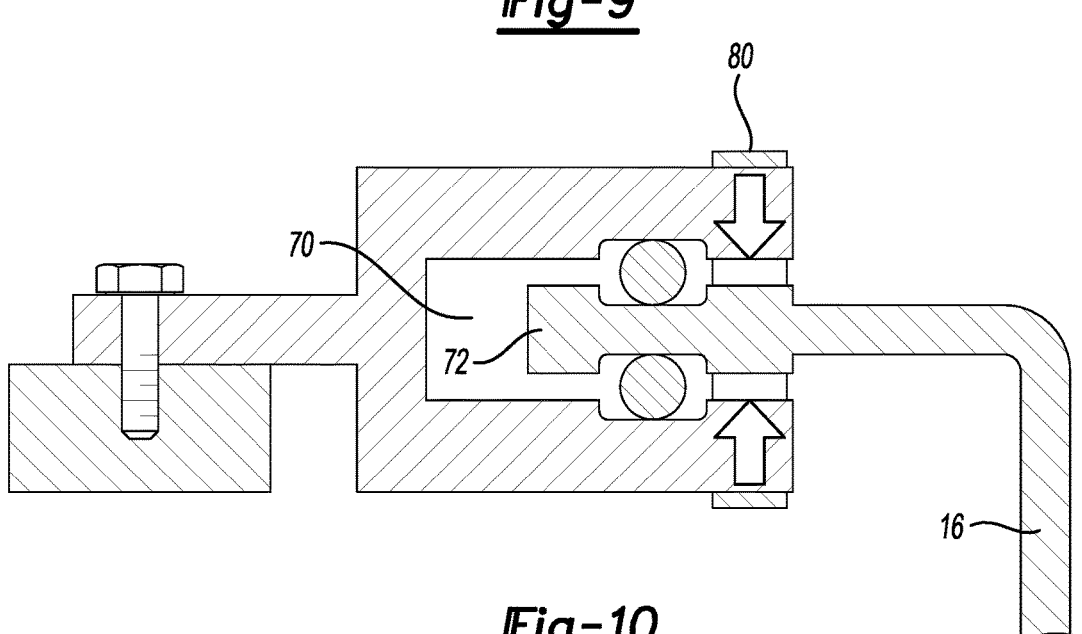
FIG. 10 a vertical cross-section view of another embodiment of a flexible joint installed between the lead connection and the wire supplying power from a power source.

Referring to FIG. 10, another embodiment is disclosed that is similar to the embodiment of FIG. 8 but differs in that an external spring clip 80 is provided to exert a biasing force around the perimeter of the terminal plug portion 72 as shown in FIGS. 8 and 9. This embodiment eliminates the coil spring 82 and hole 84 in the terminal plug portion 72. As described with reference to FIG. 8, The ball bearings 58 allow the terminal plug portion 72 to move in the X and Y directions relative to the receptacle 70 to dampen shocks applied to the lead wires 16 by operation of the e-machine, the vehicle, or other sources of vibration.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A stator assembly for an e-machine comprising:

a stator including pin conductors encircling the stator for conducting current around the stator for a plurality of phases of alternating current, at least one phase terminal, at least one neutral terminal;

a plurality of wires each being adapted to connect one of the at least one phase terminals to a source of alternating current or one of the at least one neutral terminals;

a plurality of terminal contacts each being connected to one of the plurality of wires, wherein each terminal contact is connected to one of the terminals, wherein at least one of the wires is provided with means for dampening vibration disposed adjacent one of the terminals; and wherein the means for dampening vibration is a flexible joint disposed between the terminal contact and the wire, the flexible joint including a receptacle, a terminal plug that is received in the receptacle, a plurality of ball bearings disposed around the terminal plug inside the receptacle, and a spring acting on the receptacle to exert a contractive force on the ball bearings and the terminal plug.

2. An e-machine comprising:

a stator including pin conductors encircling the stator for conducting current around the stator for a plurality of phases of alternating current, at least one phase terminal, at least one neutral terminal, a plurality of wires each being adapted to connect one of the at least one phase terminals to a source of alternating current or one of the at least one neutral terminals; a plurality of terminal contacts each being connected to one of the plurality of wires, wherein each terminal contact is connected to one of the terminals; and at least one flexible joint includes a receptacle that defines a cavity; and a terminal plug provided on one of the wires, wherein the terminal plug is connected to the receptacle through a plurality of ball bearings, and wherein current flows from the wire to the terminal plug through the ball bearings to the receptacle, wherein the flexible joint is disposed between the terminal contact and the wire, the flexible joint including the receptacle, the terminal plug that is received in the receptacle, the plurality of ball bearings disposed around the terminal plug inside the receptacle, and a spring acting on the receptacle to exert a contractive force on the ball bearings and the terminal plug.

* * * * *